United States Patent
Ganesan et al.

(10) Patent No.: US 10,853,125 B2
(45) Date of Patent: Dec. 1, 2020

(54) RESOURCE EFFICIENT ACCELERATION OF DATASTREAM ANALYTICS PROCESSING USING AN ANALYTICS ACCELERATOR

(71) Applicant: Oracle International Corporation, Redwood City, CA (US)

(72) Inventors: Karthik Ganesan, Austin, TX (US); Shrinivas B. Joshi, Milpitas, CA (US); Yao-Min Chen, San Jose, CA (US); Luyang Wang, Santa Clara, CA (US); Ahmed Khawaja, Austin, TX (US)

(73) Assignee: Oracle International Corporation, Redwood City, CA (US)

( * ) Notice: Subject to any disclaimer, the term of this patent is extended or adjusted under 35 U.S.C. 154(b) by 384 days.

(21) Appl. No.: 15/287,695

(22) Filed: Oct. 6, 2016

(65) Prior Publication Data
US 2018/0052708 A1  Feb. 22, 2018

Related U.S. Application Data

(60) Provisional application No. 62/377,407, filed on Aug. 19, 2016.

(51) Int. Cl.
*G06F 9/46* (2006.01)
*G06F 9/48* (2006.01)
(Continued)

(52) U.S. Cl.
CPC ............ *G06F 9/485* (2013.01); *G06F 9/4812* (2013.01); *G06F 9/5044* (2013.01);
(Continued)

(58) Field of Classification Search
CPC ...... G06F 9/485; G06F 9/4812; G06F 9/5044; G06F 9/4856; G06F 9/4843;
(Continued)

(56) References Cited

U.S. PATENT DOCUMENTS

| | | | |
|---|---|---|---|
| 5,923,892 A | 7/1999 | Levy | |
| 6,430,570 B1 * | 8/2002 | Judge | G06F 9/44594 707/769 |

(Continued)

OTHER PUBLICATIONS

James Clarkson, et al., "Boosting Java Performance using GPGPUs", arXiv:1508.06791v1 [cs.DC], Aug. 27, 2015, pp. 1-10.
(Continued)

*Primary Examiner* — Hiren P Patel
(74) *Attorney, Agent, or Firm* — Robert C. Kowert; Kowert, Hood, Munyon, Rankin & Goetzel, P.C.

(57) ABSTRACT

An offload engine may attempt to offload, on behalf of applications, data operations to be performed on a datastream. The offload engine may intercept one or more data operations, such as may be part of a collections API, performed by an application. The data operations and the datastream may be specified and/or provided by the application and, in response, the offload engine may be configured to execute (or attempt to execute) the data operations on the datastream using an analytics accelerating co-processor rather than using a general purpose CPU core. The offload engine may determine whether or not to offload the data operations to the analytics accelerating co-processor. If the offload is unsuccessful or if the offload engine determines that the data operations are not suitable for offloading, the offload engine may then cause the data operations to be performed using general purpose CPU cores on the system.

20 Claims, 6 Drawing Sheets

(51) Int. Cl.
*G06F 11/14* (2006.01)
*G06F 9/50* (2006.01)
*G06F 11/07* (2006.01)

(52) U.S. Cl.
CPC ...... *G06F 11/1482* (2013.01); *G06F 11/0757* (2013.01); *G06F 2209/509* (2013.01)

(58) Field of Classification Search
CPC ...... G06F 9/4806; G06F 9/4881; G06F 9/465; G06F 9/46; G06F 9/505; G06F 9/5083; G06F 9/5088; G06F 11/0715; G06F 11/1482
See application file for complete search history.

(56) References Cited

U.S. PATENT DOCUMENTS

| | | | | |
|---|---|---|---|---|
| 6,473,777 | B1* | 10/2002 | Hendler | G06F 9/3879 |
| 6,640,299 | B1* | 10/2003 | Mang | G06F 9/3001 |
| | | | | 712/219 |
| 6,826,749 | B2 | 11/2004 | Patel et al. | |
| 6,865,607 | B1* | 3/2005 | de Jong | G06F 9/541 |
| | | | | 709/202 |
| 8,312,219 | B2* | 11/2012 | Cher | G06F 12/0253 |
| | | | | 707/813 |
| 8,326,819 | B2* | 12/2012 | Indeck | G06F 16/22 |
| | | | | 707/711 |
| 8,339,404 | B2 | 12/2012 | Pryor et al. | |
| 8,392,463 | B2 | 3/2013 | Gautam et al. | |
| 8,621,484 | B2* | 12/2013 | Ohly | G06F 11/10 |
| | | | | 719/310 |
| 8,904,384 | B2* | 12/2014 | Low | G06F 9/5088 |
| | | | | 717/148 |
| 9,207,958 | B1 | 12/2015 | Kissell | |
| 9,639,473 | B1* | 5/2017 | Adda | G06F 12/0875 |
| 9,811,390 | B1* | 11/2017 | Ma | G06F 9/5038 |
| 2002/0078115 | A1 | 6/2002 | Poff et al. | |
| 2002/0080267 | A1* | 6/2002 | Moluf | H04N 7/52 |
| | | | | 348/385.1 |
| 2003/0236813 | A1* | 12/2003 | Abjanic | G06F 9/5044 |
| | | | | 718/102 |
| 2004/0003018 | A1* | 1/2004 | Pentkovski | G06F 9/5044 |
| | | | | 718/100 |
| 2004/0049531 | A1* | 3/2004 | Honda | G06F 9/4806 |
| | | | | 709/201 |
| 2004/0123303 | A1* | 6/2004 | Trotter | G06F 9/5016 |
| | | | | 719/315 |
| 2005/0240906 | A1* | 10/2005 | Kinderknecht | G06F 9/44521 |
| | | | | 717/136 |
| 2005/0240915 | A1 | 10/2005 | Patel | |
| 2005/0268309 | A1* | 12/2005 | Krishnaswamy | G06F 9/548 |
| | | | | 719/330 |
| 2006/0037004 | A1* | 2/2006 | Long | G06F 9/45504 |
| | | | | 717/127 |
| 2006/0101422 | A1* | 5/2006 | Bourges-Waldegg | |
| | | | | G06F 9/548 |
| | | | | 717/136 |
| 2007/0011415 | A1* | 1/2007 | Kaakani | G06F 12/0269 |
| | | | | 711/159 |
| 2007/0038843 | A1* | 2/2007 | Trivedi | G06F 15/7864 |
| | | | | 712/34 |
| 2007/0118724 | A1 | 5/2007 | Patel | |
| 2007/0276784 | A1* | 11/2007 | Piedmonte | G06F 16/2453 |
| 2008/0049660 | A1* | 2/2008 | Kwan | H04W 52/267 |
| | | | | 370/318 |
| 2008/0127158 | A1* | 5/2008 | Carlos | G06F 9/451 |
| | | | | 717/168 |
| 2008/0163183 | A1* | 7/2008 | Li | G06F 8/456 |
| | | | | 717/149 |
| 2008/0172668 | A1* | 7/2008 | Tzruya | G06F 9/505 |
| | | | | 718/101 |
| 2009/0310408 | A1* | 12/2009 | Lee | G11C 11/5628 |
| | | | | 365/185.03 |
| 2011/0153690 | A1* | 6/2011 | Allen | G06F 12/0269 |
| | | | | 707/816 |
| 2011/0153691 | A1* | 6/2011 | Allen | G06F 12/0253 |
| | | | | 707/816 |
| 2011/0173155 | A1* | 7/2011 | Becchi | G06F 9/5044 |
| | | | | 707/610 |
| 2012/0216015 | A1* | 8/2012 | Mitra | G06F 9/445 |
| | | | | 712/28 |
| 2013/0019000 | A1* | 1/2013 | Markus | G06F 9/466 |
| | | | | 709/223 |
| 2013/0047155 | A1* | 2/2013 | Caspole | G06F 9/445 |
| | | | | 718/1 |
| 2013/0160016 | A1* | 6/2013 | Gummaraju | G06F 9/5044 |
| | | | | 718/102 |
| 2013/0321436 | A1 | 12/2013 | Hoeg | |
| 2014/0095468 | A1* | 4/2014 | Aingaran | G06F 17/30501 |
| | | | | 707/713 |
| 2014/0156735 | A1* | 6/2014 | Yamasaki | H04L 69/28 |
| | | | | 709/203 |
| 2014/0223151 | A1 | 8/2014 | Chapman et al. | |
| 2015/0026194 | A1* | 1/2015 | Dziedzicki | G06F 17/30985 |
| | | | | 707/748 |
| 2015/0058614 | A1* | 2/2015 | Degenaro | G06F 9/5027 |
| | | | | 713/100 |
| 2015/0199214 | A1* | 7/2015 | Lee | G06F 9/505 |
| | | | | 718/102 |
| 2015/0242487 | A1* | 8/2015 | Varakin | G06F 16/2453 |
| | | | | 707/616 |
| 2015/0277877 | A1* | 10/2015 | Feng | G06F 8/443 |
| | | | | 717/155 |
| 2015/0347328 | A1* | 12/2015 | Dominguez | G06F 13/24 |
| | | | | 710/267 |
| 2016/0006758 | A1* | 1/2016 | Holt | H04L 63/1466 |
| | | | | 726/23 |
| 2016/0044077 | A1* | 2/2016 | Tripathy | G06F 16/188 |
| | | | | 709/213 |
| 2016/0077852 | A1 | 3/2016 | Kissell | |
| 2016/0092238 | A1* | 3/2016 | Codrescu | G06F 9/30036 |
| | | | | 712/200 |
| 2016/0283198 | A1* | 9/2016 | Walker | G06F 8/30 |
| 2016/0292120 | A1* | 10/2016 | Sato | G06F 13/4068 |
| 2017/0109210 | A1* | 4/2017 | Goossens | G06F 8/44 |
| 2017/0169100 | A1* | 6/2017 | Reshadi | G06F 21/64 |
| 2017/0206169 | A1* | 7/2017 | Coppola | G06F 9/44505 |
| 2018/0307535 | A1* | 10/2018 | Suzuki | G06F 9/50 |

OTHER PUBLICATIONS

"Google Code Archive—Long-term storage for Google Code Project Hosting", retrieved from URL: https://code.google.com/archive/p/aparapi/ on Sep. 6, 2016, pp. 1-4.

Michael J. Flynn, "Some Computer Organizations and Their Effectiveness", IEEE Transactions on Computers, vol. c-21, No. 9, Sep. 1972, pp. 1-44.

"Stream (Java Platform SE *)—Interface Stream <T>", Retrieved from URL: https://docs.oracle.com/javase/8/docs/api/java/util/stream/Stream.html, pp. 1-32.

Eric Capsole, "AMD's Prototype HSAIL-enabled JDK8 for the OpenJDK Sumatra Project", AMD, JVM Languuage Summit, Jul. 2013, pp. 1-24.

Tom Deneau, "Sumatra New Features Coordinating Between the CPU and the JVM", AMD, JVM Language Summit, Jul. 28, 2014, pp. 1-32.

Aaftab Munshi, et al., "The OpenCL C Specification", Khronos OpenCL Working Group, Version 2.0, Document Revision 33, Apr. 13, 2016, pp. 1-205.

"Java Util Stream (Java Platform SE 8)—Package java.util.stream", Retrieved from URL: https://docs.oracle.com/javase/8/docs/api/java/util/stream/package-summary.html on Sep. 6, 2016, pp. 1-15.

Jeff Heaton, "Part 1: Programming your Graphics Card (GPU) with Java & OpenCL", Retrieved from URL: http://www.codeproject.com/Articles/86551/Part-Programming-your-Graphics-Card-GPU-... on Sep. 6, 2016, pp. 1-8.

"Aparapi Quick Reference Guide", Retrieved from URL: https://github.com/aparapi/aparapi/blob/master/QuickReference.pdf, pp. 1-2.

(56) References Cited

OTHER PUBLICATIONS

John Rose, et al., "State of the Values", Retrieved from URL: http://cr.openjdk.java.net/~jrose/values/values-0.html on Sep. 6, 2016, pp. 1-31.
Nicole Hemsoth, "Toolset Expands for GPU Accelerated Java Development", Retrieved from URL: http://www.nextplatform.com/2015/09/09/toolset-expands-for-gpu-accelerated-java-develop . . . on Sep. 6, 2016, pp. 1-5.

* cited by examiner

RESOURCE EFFICIENT ACCELERATION OF DATASTREAM ANALYTICS PROCESSING USING AN ANALYTICS ACCELERATOR

This application claims benefit of priority to U.S. Provisional Patent Application Ser. No. 62/377,407, filed Aug. 19, 2016, which is hereby incorporated herein in its entirety.

BACKGROUND

Field of the Disclosure

This disclosure relates generally to software programming, and more particularly to systems and methods for improving performance for datastream processing using co-processors, such as analytics accelerating co-processors.

Many types of applications, such as analytics applications as one example, may include a significant amount of data parallelism (e.g., explicit data parallelism). Executing these types of applications on a general purpose central processing unit (CPU) core processor generally results in high response times, high resource consumption, high energy consumption, and/or extensive heat dissipation. Therefore, these types of applications traditionally may not be readily consolidated, such as in a cloud-based execution environment.

Description of the Related Art

Many applications today use collections, allowing grouping and processing a large amount of data efficiently in a programmer friendly manner. For example, Java™ includes the Java Collections and the Streams API. The Streams API may be considered to leverage and/or build on the Collections API. One key capability of the use of collections (e.g., the use of the Streams API on collections in one Java-based example) is to process data in collections in an efficient manner, such as in a manner similar to using a database (e.g., SQL) query. Thus, a user may write abstract query-like commands leveraging a collections API without writing the details of iterating over the collection entities.

Traditionally, the execution of the collections based datastream operations is not hardware accelerated. Thus, execution may be slow and may use a large amount of resources on the processor chip—possibly resulting in higher power consumption and/or system utilization. Typically, collections based datastream operations, when executed on a CPU core, involve the creation of a number of threads potentially holding large numbers of resources on the chip. Additionally, higher system utilization and/or power consumption may be not conducive to consolidation of applications in modern, networked environments (e.g., on the cloud).

SUMMARY

A system that includes an analytics accelerating co-processor may be configured to implement an offload engine that may attempt to offload, on behalf of an application, one or more data operations to be performed on a datastream. The data operations and the datastream may be specified and/or provided by the application and, in response the offload engine may be configured to execute (or attempt to execute) the data operations on the datastream using an analytics accelerating co-processor rather than using a general purpose CPU core.

The offload engine may intercept one or more data operations, such as may be part of a collections API, performed by an application. The offload engine may then determine whether or not to offload the data operations to the analytics accelerating co-processor. If the offload engine determines that the data operations are not suitable for offloading, the offload engine may then cause the data operations to be performed using one or more general purpose CPU cores on the system. Additionally, if the offload is attempted, but unsuccessful, the data operations may be performed using the general purpose CPU core(s). In some embodiments, it may be transparent to the application code (e.g., and/or to a user) whether the data operations were successfully offloaded or performed using the general purpose CPU core(s).

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, an offload engine may attempt to offload, on behalf of an application, one or more data operations to be performed on a datastream. The data operations and the datastream may be specified and/or provided by the application and, in response the offload engine may be configured to execute (or attempt to execute) the data operations on the datastream using co-processor, such as a data analytics accelerator, an analytics accelerating co-processor or a query accelerating co-processor, rather than using a core processor (e.g., a general purpose CPU core).

Figure 1:
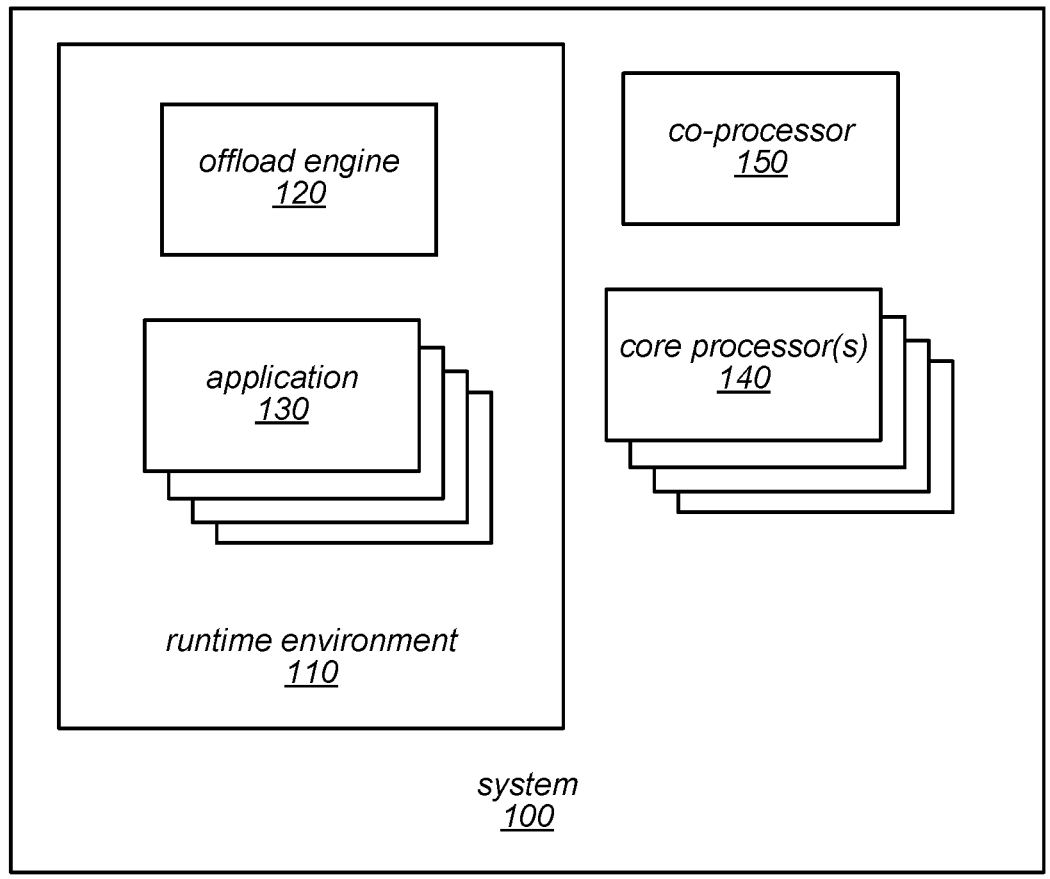
FIG. 1 is a logical block diagram illustrating a system that includes an offload engine, according to one embodiment.

FIG. 1 is a block diagram illustrating a system suitable for implementing Resource Efficient Acceleration of Datastream Analytics Processing Using an Analytics Accelerator, as described herein. An offload engine, such as offload engine 120 may be implemented as, or may execute within, part of a runtime environment 110 of system 100. System 100 may include one or more processors, such as general purpose CPU cores 140 and at least one co-processor 150. Co-processor 150 may represent any of various co-processors, such as an analytics accelerating co-processor or query accelerating co-processor, according to various embodiments. For instance, in one example embodiment, system 100 may represent a SPARC™ system (e.g., M, T and/or S series SPARC™ system) and co-processor 150 may represent a Data Analytics Accelerator (DAX) co-processor that is part of that system. In general, the terms "co-processor", "data analytics accelerator", "analytics accelerating co-processor" and "query accelerating co-processor" may be used interchangeably herein.

Within system 100, runtime environment 110 may represent a platform-independent, object-oriented, runtime environment, such as a Java™-based runtime environment, according to one example embodiment. Application 130 may represent a Java™-based application developed according to a Java Development Kit (JDK) utilizing one or more objects and/or methods for performing data operations on a stream of data (i.e., a datastream), according to one example embodiment.

While explained herein in terms of Java Streams being accelerated by offloading data operations to a DAX co-processor on a SPARC™ system, the methods, mechanisms, functions, and/or algorithms described herein may be implemented using other systems, processors, co-processors, runtime environments, data operations, software libraries, etc., according to various embodiments. The use of Java Streams being accelerated by offloading data operations to a DAX co-processor on a SPARC™ system, as described herein, represent merely one possible example embodiment of Resource Efficient Acceleration of Datastream Analytics Processing Using an Analytics Accelerator.

Unlike enabling Java applications to take advantage of a Graphics Processing Unit (GPU) (e.g., by an OpenJDK project called Sumatra) where only the ForEach operation of Streams may be offloaded to the GPU, Resource Efficient Acceleration of Datastream Analytics Processing Using an Analytics Accelerator, as described herein, may involve offload of many different Streams operations to an analytics accelerating co-processor (rather than a GPU, which may be quite different). For example, applications utilizing a GPU (such as with Sumatra) may require translation of lambda and/or stream operations to GPU capable kernels, such as those based on Open Computing Language (OpenCL) or Heterogeneous System Architecture Intermediate Language (HSAIL). Additionally, offloading various Streams operations to an analytics accelerating co-processor may involve taking hints for data parallelism from the Streams API itself, according to one example embodiment. In some embodiments, the analytics accelerating co-processor implementation may include direct match to Streams operations, thereby possibly providing higher level analytics accelerator functions like scan, select, etc.

The Streams API may allow applications to access data/databases in an efficient and user-friendly manner. For example, the Streams API may allow applications efficient and/or user-friendly access to Java-based analytics, Java-based implementations of memory grids (e.g., Oracle Coherence), Apache Spark transformations and NoSQL databases, as some examples. Traditionally, the execution of the Streams API operations is not hardware accelerated using an analytics accelerator. Thus, execution may be slow and may use a large amount of resources on the processor chip—possibly resulting in higher power consumption and/or system utilization. Slower execution times may result in higher response times for customer applications. Typically, collections based datastream operations (e.g., via the Streams API), when executed on a CPU core, possibly disallows real-time analysis, may have prohibitive startup costs, and may involve the creation of a number of threads potentially hogging massive amounts of resources on the chip. Additionally, higher system utilization and/or power consumption may be not conducive to consolidation of applications on the cloud.

In some embodiments, a run-time decision may be made whether to run an operation on the co-processor or the general purpose CPU core based, at least in part, on the size of the input data to the operation. Additionally, only parallel Streams (e.g., explicit Single Instruction Multiple Data—where the programmer specifies that operations on the collection of objects can go in parallel) may be offloaded to the co-processor, according to some embodiments. In some embodiments, a decision as to whether to offload operations may be made for a subset of the elements of the collection independently.

Figure 2:
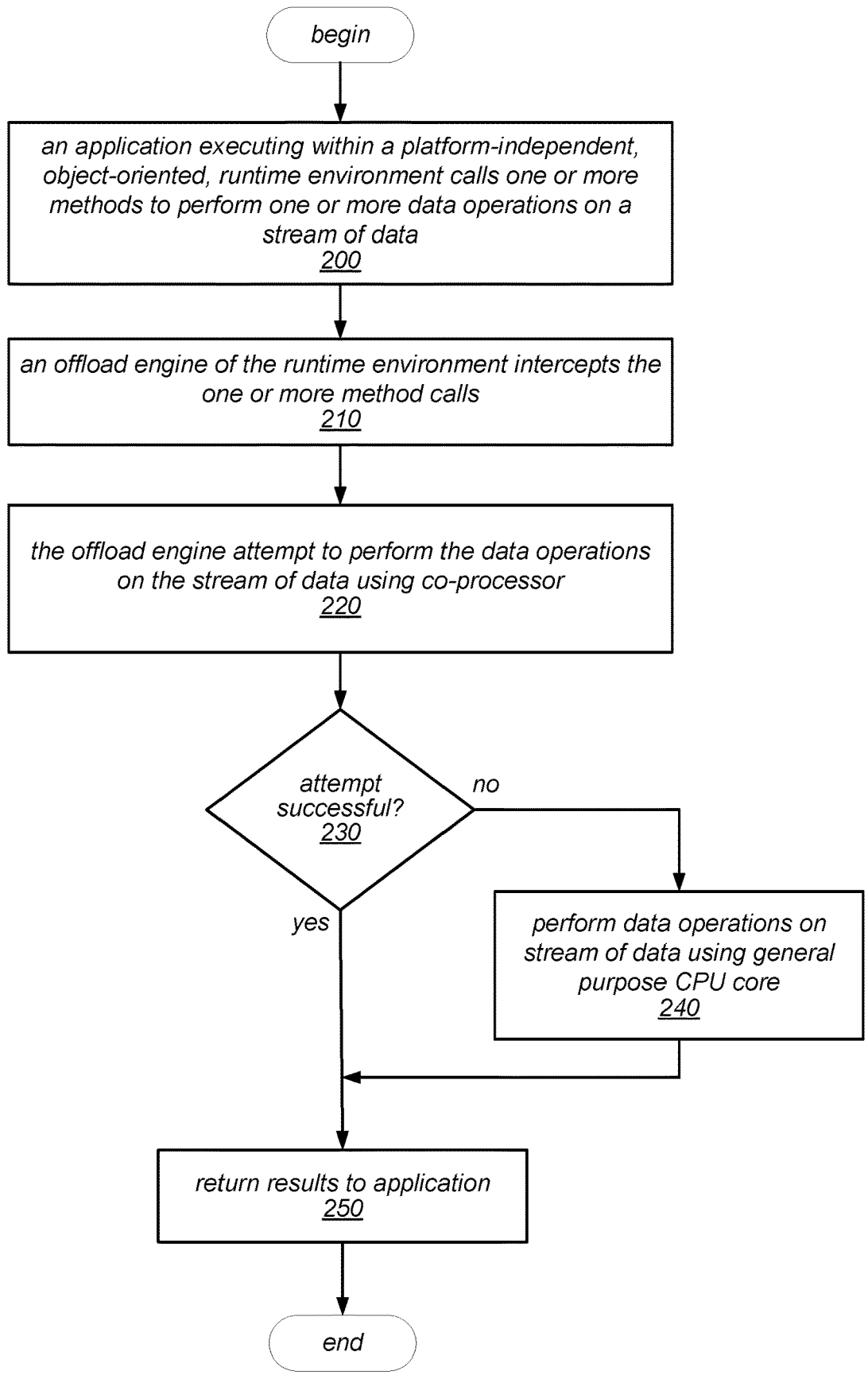
FIG. 2 is a flowchart illustrating one embodiment of a method for performing Resource Efficient Acceleration of Datastream Analytics Processing Using an Analytics Accelerator, as described herein.

FIG. 2 is a flowchart illustrating one embodiment of a method for Resource Efficient Acceleration of Datastream Analytics Processing Using an Analytics Accelerator, as described herein. As illustrated in block 200, an application executing within a platform-independent object-oriented, runtime environment, such as application 130, may call one or more methods to perform one or more data operations on a stream of data. For instance, using a Java-based example, an application may utilize one or more Java Streams interfaces to load, read, analyze, parse, modify, etc. a stream of data, and may therefore call (either directly or indirectly) one or more methods of a Java Streams object. An offload engine, such as offload engine 120, may intercept the one or more method calls, as in block 210. For example, in one embodiment offload engine 120 may be implemented as part of a software library that also implements, at least part of, the methods called by the application. For instance, continuing the Java-based example, offload engine 120 may be, at least partly, implemented as part of a library that also provides one or more Java Streams methods and when an application calls the Java Streams method (either directly or indirectly, such as by instantiating a Streams object) the implementation of offload engine 120 may be executed. In some embodiments, the library (e.g., a runtime library) may be modified to include versions of methods (e.g., Java Streams methods in a Java-based example) that are configured to utilize offload engine 120 in order to perform Resource Efficient Acceleration of Datastream Analytics Processing Using an Analytics Accelerator, as described herein. Thus, when an application calls one or more methods to perform data operations on a stream of data, one or more methods of offload engine 120 may be executed rather than legacy or existing versions of the called methods.

The methods of offload engine 120 may attempt to perform the data operations on the stream of data using a co-processor, such as an analytics accelerating co-processor, as in block 220. For example, in one embodiment, offload engine 120 may be configured to utilize a software library that provides object, methods, functions, etc., for interacting with a co-processor, such as analytics accelerating co-processor 150, to perform one or more data operations on the stream of data. In one example implementation using Java Streams, offload engine 120 may be configured to map the one or more data operations to be performed on the stream of data to one or more corresponding co-processor calls in order to perform the data operations on the stream of data using the co-processor. Additionally, offload engine 120 may be configured to inspect, analyze, or otherwise examine the data operations to be performed and the stream of data on which the data operations are to be performed in order to determine whether or not the data operations, as applied to the stream of data, are suitable for offloading to the co-processor. In some embodiments, an attempt to perform data operations on a stream of data using a co-processor may include determining whether or not to actually offload the data operations to the co-processor. Thus, the attempt to perform the data operations on the stream of data using an analytics accelerating co-processor illustrated in block 220 may also include determining whether the data operations are suitable for offloading.

If the attempt is successful, as illustrated by the positive output of decision block 230, offload engine 120 may be configured to return results of performing the data operations on the stream of data to the application, as in block 250, according to some embodiments. Thus, if the one or more data operations are successfully offloaded to, and successfully executed by, the co-processor, offload engine 120 may return results to the application. The results returned by offload engine 120 to the application may include any of various information and/or data regarding the data operations and/or the stream of data, according to various embodiments. For example, the one or more data operations may involve parsing, scanning, examining or modifying the stream of data in order to determine information regarding the formatting or content of the stream of data and therefore, in some embodiments, offload engine 120 may return information regarding the formatting or content of the stream of data. In general, offload engine 120 may be configured to return to the application results that correspond, or are equivalent to, results that would have been returned from performing the data operations on the datastream using an existing or legacy library. Furthermore, in some embodiments, offload engine 120 may be configured to return to the application results that are identical to results that would have been returned from performing the data operations on the datastream using an existing or legacy library For instance, using a Java-based example, the application may have utilized a Java Streams library to perform data operations on a stream of data and offload engine 120 may have intercepted one or more methods calls in order to offload those data operations to an analytics accelerating co-processor. If the attempt to offload the data operations is successful, offload engine 120 may return results to the application and those results may conform to the Java Stream interface definition (e.g., return values as defined by the Java Streams class/method definitions), according to one example embodiment.

Returning to FIG. 2, if the attempt to offload the data operations is unsuccessful, as indicated by the negative output of decision block 230, offload engine 120 may perform the data operations on the stream of data using the general purpose CPU core, as in block 240, before returning results of performing the data operations to the application as in block 250. In some embodiments, the results returned to the application may be the same (e.g., identical, equivalent and/or identical in value) regardless of whether the data operations were successfully offloaded to the co-processor or performed using the general purpose CPU core. As will be described in more detail subsequently, an attempt to perform the data operations using a co-processor may be unsuccessful for other reasons, such as due to the size of the data, the suitability for parallel performance, busy co-processor, the attempt timing out, the requirements of garbage collection, etc., according to various embodiments.

Figure 3:
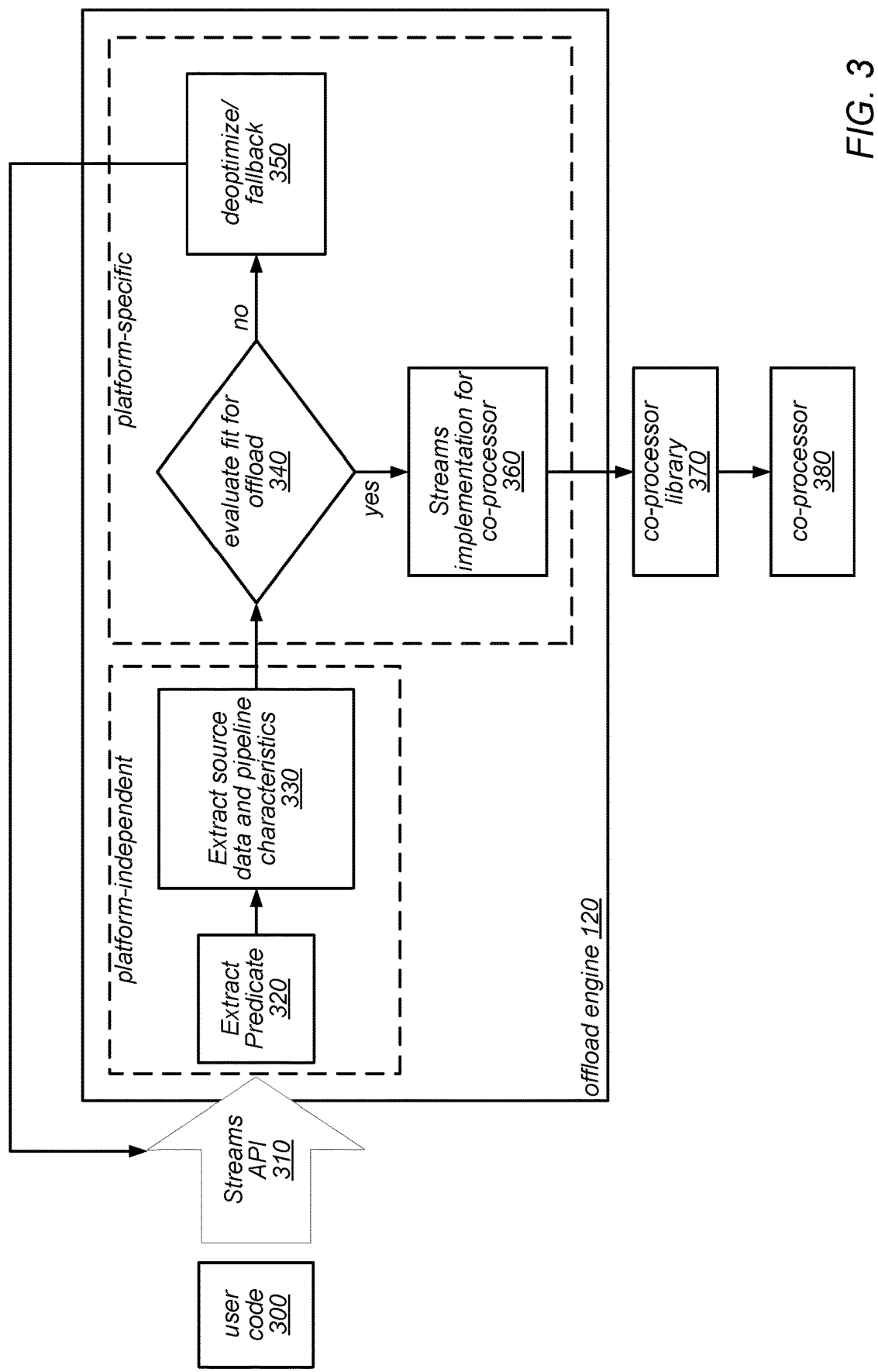
FIG. 3 is a logical block diagram illustrating an example dataflow through a system utilizing an offload engine, as described herein according to one embodiment.

FIG. 3 is a logical block diagram illustrating one embodiment of control flow in a system configured to perform Resource Efficient Acceleration of Datastream Analytics Processing Using an Analytics Accelerator, as described herein. According to one Java-based example embodiment, user code 300, such as may be part of application 130, may call one or more methods according to a Streams API 310 to perform one or more data operations on a datastream. Thus, in the illustrated example, user Java code that makes use of Streams API may be considered a target for offload. In response to the application calling the data operation methods (e.g., using the Streams API), offload engine 120 may, such as in preparation for evaluating the data operations and/or datastream for potential offloading and/or in preparation for mapping the data operations to corresponding co-processor functions, extract predicate information, source data and/or pipeline characteristics from the called methods and any parameters supplied to the methods, as in blocks 320 and 330. Offload engine 120 may, within platform-independent functionality create an offload artifact including information about the Stream pipeline, source data and predicates and pass the offload artifact as metadata to an offload function that can be implemented as an intrinsic for each accelerator/platform, according to the illustrated Java-based example.

As described herein, source data (e.g., such as in the context of Streams API) may represent arrays or other data structures, such as Java Collections, on which the operations (e.g., defined using the Streams API) may be performed. A predicate may, in some embodiments, be a Java lambda expression or a functional interface that typically uses the elements of the source data as input and performs equality/relational types of operations on the input, resulting in a boolean value. For example, in one embodiment, an IntPredicate may be a method that consumes an integer element of source data and returns a boolean. Additionally, as described herein, a pipeline (e.g., in the context of Java Streams, according to one embodiment) may be defined as a sequence of operations to be done on the source data with zero or more intermediate operations followed by one terminal operation. In the context of a runtime environment (e.g., a JVM Java run-time, in one embodiment), intrinsics methods may be API methods (e.g., JDK API methods) or runtime (e.g., JVM) operations for which the runtime environment may provide specialized, more optimized, processor- and/or architecture-specific implementations. The runtime environment (e.g., JVM) may choose to use an intrinsics implementation, a non-intrinsics implemetation, an interpreted implementation, or runtime-compiled implementation (e.g., such as using a Just-In-Time compiler) while executing such intrinsified operations.

As shown, different areas of the functionality of offload engine 120 may be divided between a platform-independent portion and a platform-specific portion, according to various embodiments. For instance, a portion of offload engine 120 may be implemented as part of a development library, such as part of a Java Development Kit (JDK) library, in one Java-based example. Additionally, another portion of offload engine 120 may be implemented using platform-specific methods, libraries, etc., such as to work efficiently with the specific co-processor being used on a particular system, such as may be provided as part of a platform-independent, object-oriented, runtime environment (e.g., a JVM Java run-time, in one Java-based example). As illustrated by blocks 340, 350 and 360, offload engine 120 may perform platform specific functionality related to evaluating the data operations and/or datastream for offloading, and either falling back to use the general purpose CPU cores to perform the data operations on the datastream or utilizing one or more platform specific implementations for the method called by the applications, such as by utilizing a Streams implementation for the co-processor according to one Java-based example.

Thus, a platform-specific portion of offload engine 120 may include a compiler intrinsic method for offload of a subset of Stream functions to a co-processor (e.g., DAX on Oracle SPARC, in one example). This decoupled approach may reduce and/or minimize changes to the existing library implementation (e.g., Java Streams library) and to allow those changes to be platform agnostic, thereby providing an interface for easy and efficient offload to an accelerator on virtually any platform provided that the runtime environment also has the appropriate functionality, according to some embodiments. Additionally, offload engine 120 may utilize one or more libraries that provide various mechanisms for using the co-processor (e.g., using an analytics accelerating co-processor), as illustrated by blocks 370 and 380.

Figure 4:
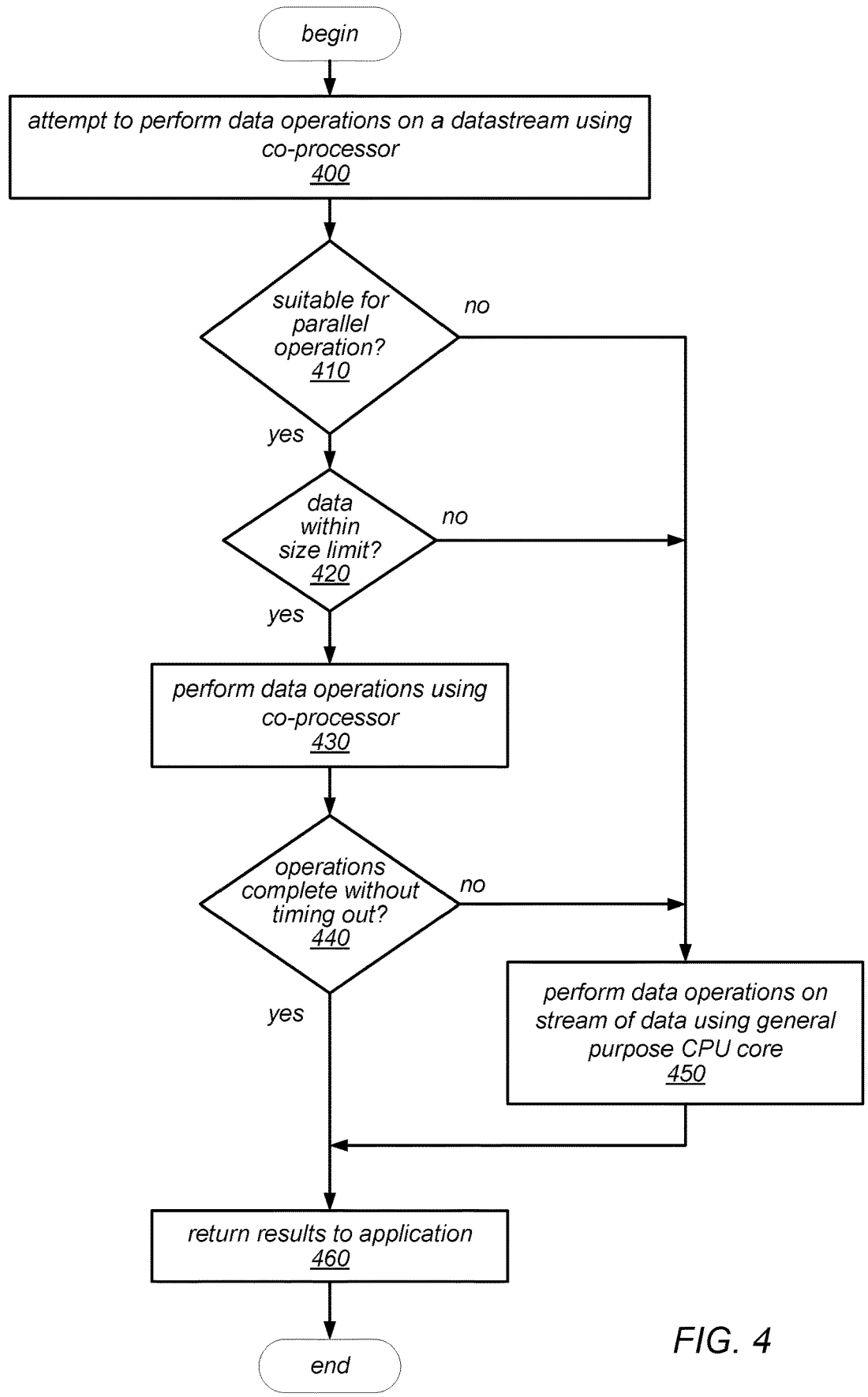
FIG. 4 is a flowchart illustrating one embodiment of a method for attempting to offload one or more data operations to be performed on a datastream, as described herein.

An attempt to offload the data operations to the co-processor may be considered unsuccessful for any of variety of reasons, according to various embodiments. For instance, as noted above, offload engine 120 may be configured to inspect, analyze, or otherwise for example, the data operations and/or the stream of data, in order to determine whether the data operations, when applied to the stream of data, are suitable for offloading. Such a determination may be considered part of attempting to perform the data operations using a co-processor, in some embodiments. FIG. 4 is a flowchart illustrating one embodiment of attempting to offload one or more data operations, as described herein. For example, as part of an attempt to perform one or more data operations on a datastream using a co-processor, such as an analytics accelerating co-processor, as shown in block 400, offload engine 120 may be configured to determine whether the data operations, as applied to the datastream are suitable for parallel operation, as in decision block 410. As noted above, in some embodiments, offload engine may rely on the application (e.g., the programmer) to specify whether the operations are suitable for parallel performance. In other embodiments, however, other methods may be utilized to determine whether the data operations and/or the datastream are suitable for parallel performance. Additionally, in some embodiments, offload engine 120 may be configured to offload data operations regardless of their suitability for parallel performance.

Additionally, in some embodiments, offload engine 120 may be configured to determine whether the datastream is either too large or too small for the data operations to be offloaded. For example, if the datastream is smaller than a predetermined threshold, offload engine 120 may determine not to perform the data operations on the stream of data using an analytics accelerating co-processor (e.g., it may not be worth the effort to offload the data operations for a very small stream of data) and thus the attempt to offload the data operations may be considered unsuccessful, as illustrated by the negative to output of decision block 420. Similarly, offload engine 120 may determine that the stream of data is larger than a predetermined threshold and therefore determine not to perform the data operations on the stream of data using an analytics accelerating co-processor. Additionally, in some embodiment, offload engine may be configured to only offload data operations that are suitable for parallel operation, and thus offload engine may determine whether the data operations, when applied to the stream of data, are suitable for parallel operation. For instance, in some embodiments, offload engine may be configured to only offload data operations for which the application (or the programmer of the application) specifies that the operations may be performed in parallel (e.g., an explicit Single Instruction Multiple Data declaration) for each element in a collection of objects (e.g., representing the data operations and/or stream of data) independently.

In some embodiments, an attempt to perform data operations on a stream of data using a co-processor may be unsuccessful if the attempt takes longer than a predetermined timeout period. Thus, if the attempt to perform the data operations times out (e.g., takes longer than a predetermined timeout period), as illustrated by the negative output of decision block 440, offload engine 120 may be configured to perform the data operations on the stream of data using the general purpose CPU core(s), as in block 450. If multiple time outs happen with the co-processor, offload engine 120 may stop using the co-processor temporarily. Additionally, offload engine 120 may return results of perform the data operations on the datastream to the application (i.e., regardless of whether the data operations were performed using a co-processor or one or more general purpose CPU cores), as in block 460.

Additionally, in some embodiments, data operations may be chained together, such that the output of one operation may be passed as input to the next. For instance, in one Java-based example embodiment, JDK8 Streams may chain the operations by pipelining the Collection data. Such a chaining feature may allow a user to pass the output of one pipeline stage to the next pipeline stage without needing to create a new Stream object. Additionally, some analytics accelerating co-processors may include a hardware feature that may be able to pass the output of one coprocessor operation to another without writing the intermediate results to memory. Thus, in some embodiments, an operation-chaining ability within a software library may be mapped to a corresponding chaining ability with an analytics accelerating co-processor. Such a feature may, in some embodiments, allow for quick and efficient chain-based processing of Stream operations (e.g., Stream operations) on the hardware.

While described herein regarding a specialized Stream called IntStream, according to one Java-based example embodiment, in general the methods, functions, mechanisms and/or functionality described herein may apply to virtually any datastream based data operations, according to various embodiments. For instance, the methods, functions, mechanisms and/or functionality described herein may apply to Java Streams composed of other primitive types, value types, and/or object types. We will use IntStream to explain our methodology in the rest of the document.

Consider the following piece of Java Code:

```
import java.util.*;
import java.util.system.*;
public class CustomerFilterTest {
    private static List<User> customers = Arrays.asList(
        new Customer(1, "John Grisham", 40),
        new Customer(4, "Andy Smith", 32),
        new Customer(3, "Michael Patton", 57),
        new Customer(9, "R Roberts", 18),
        new Customer(10, "Clooney Armstrong", 24),
        new Customer(2, "Judy Roman", 40),
        new Customer(8, "Jack Riesling", 34),
        new Customer(5, "Chen Wang", 22),
        new Customer(6, "Ho Hung", 47),
        new Customer(7, "Lee Chen", 61));
```

```
        private static void nonStreamWay( ) {
            List<Customer> frequentCustomers = new
                ArrayList<Customer>( );
            for (Customer c : customers) {
                if (c.frequency > 60) {
                    frequentCustomers.add(c);
                }
            }
        }
        private static void StreamWay( ) {
            List<Customer> frequentCustomers =
                customers.parallelStream( ).filter(c -> c.frequency >
                60).collect(Collectors.toList ( ));
        }
    }
    class Customer {
        Int id;
        String Name;
        Int frequency;
        Customer( ) {
        }
        Customer (int id, String name, int frequency) {
            this.id = id;
            this.Name = name;
            this.frequency = frequency;
        }
    }
}
```

In the example code above, a new data type, Customer, is created and stored in list of Customers. The list of Customers is a datastream on which to apply one or more data operations, which the offload engine may attempt to perform using an analytics accelerating co-processor. In many embodiments, a datastream, such as the list of Customers in the above example code, may be of virtually any size, from few entries to millions of entries.

In implementations that don't utilize streams, such as illustrated by the method nonStreamWay( ) in the above example code, the code iterates through every element of the data collection. To map such a code to a Single Instruction Multiple Data (SIMD) hardware unit, the compiler may have to go through chunks of code to identify SIMD patterns, which may be inefficient. In implementations utilizing Streams, as illustrated by the method StreamWay( ) in the above example code, the programmer may specify if an operation is data parallel and may be able to use a higher-level, more abstract way to specify the operation (e.g., using the parallelStream( ) construct). Such data parallel operations may be considered an excellent fit to be accelerated using SIMD based accelerators (e.g., Vector/SIMD units on the DAX query processor on SPARC), and may yield greater (possibly up to orders of magnitude gains) performance and/or energy efficiency, according to various embodiments.

As noted above, in some embodiments, the data operations specified by the application to be applied to the datastream may be mapped to corresponding functions (e.g., hardware units) of the analytics accelerating co-processor. Below is a table illustrating one example mapping using the Java Streams API, according to one Java-based example embodiment:

| Coprocessor operation | Stream operation |
|---|---|
| Scan Value, Scan Range Select, Fill, Extract | IntStream.filter( ) |
| | IntStream.allMatch( ) |
| | IntStream.anyMatch( ) |
| | IntStream.noneMatch( ) |
| | IntStream.count( ) |
| | IntStream.limit( ) |
| | IntStream.skip( ) |
| | IntStream.toArray( ) |

| Coprocessor operation | Stream operation |
|---|---|
| Fill | IntStream.generate( ) |
| Aggregate | IntStream.sum( ) |
| | IntStream.min( ) |
| | IntStream.max( ) |
| | IntStream.reduce( ) |
| Arith MUL-ADD | IntStream.map( ) |
| | IntStream.forEach( ) |
| Arith ADD-SUB | IntStream.map( ) |
| | IntStream.forEach( ) |
| Merge Sort | IntStream.sorted( ) |
| | IntStream.concat( ) |
| Bit Conjunct | IntStream.map( ) |
| | IntStream.forEach( ) |
| Gather | IntStream.filter( ) |

For example, using the Java-based example source code above, offload engine 120 may determine matching functionality on the co-processor hardware for the data operations of a Java Streams Filter, as discussed below, according to one example embodiment.

Scan Range on Coprocessor:

The Scan Range command scans an input vector in a given format for up to two constant values and outputs a bit vector that is a 1 whenever a match is found and 0 otherwise, according to one embodiment. A Scan Range command may return the number of matches found as an integer (e.g., in case a filter is followed by a terminal operation of count). For example:

Scan_Range (datastream, lower_bound,upper_bound)
RetVal=(int) number_of_matches

The compare operation may, in some embodiments, be a string compare that may also be used to compare integers. For example, a fixed width byte packed input format as well as minimal transformations may be used to scan signed Java integers using the string compare. Additionally, the bit vector of the output may be written in a provided memory location.

Select on Coprocessor:

According to some embodiments, a Select command on an analytics accelerating co-processor may take an input vector of a given format and a bit vector of the same size. The Select command may output a vector containing only those elements (and possibly other relevant elements) in the input vector for which the bit vector is a 1. For example:

Select(datastream, bitVector)
RetVal=(int) number_of_matches

The return value of a Select command may, according to some embodiments, be equal to the number of 1s in the input bit vector and the selected values of the vector may be written to the provided memory location. As described above, in some embodiments, data operations may be chained together so that the output of one operation is provided as the input of another. Continuing the above example, if the output of the Scan command can be chained as the input to Select command as the bit without writing the intermediate result to memory, the combined operations may be accelerated using the analytics accelerating co-processor. For instance, when chaining the output of Scan to Select, a new memory area may be allocated, initialized to be the final list frequentCustomers (according to the above example source code) and offloaded (e.g., sent) to the analytics accelerating co-processor along with the command configurations for scan and select to enable the processor to write the final output of Select. Thus, the co-processor may be provided with metadata indicating one or more data operations (e.g., Scan and Select in the above example) and the datastream on which to perform those operations. In some embodiments, the co-processor may be configured to chain those operations together, where possible, in order to improve efficiency.

Example Implementation:

In some embodiments, the functions of the co-processor may be provided (e.g., as a library) for an offload engine, such as offload engine 120, to utilize. For example, in the case of a DAX co-processor on a SPARC™ based system, a library may be provided by the manufacturer, such as a libdax library may be provided by Solaris, as one example.

Platform Independent Library:

In some embodiments, an offload engine, such as offload engine 120, may be configured to intercept existing data operation (e.g., Java Streams) calls at a high level without making any substantial modifications to existing implementation. For instance, in one Java Streams based example, the changes to the Streams implementation in the Java Development Kit (JDK) may be minimal and the modifications may ensure that execution always returns to the original implementation if an attempt to offload fails or is determined to be infeasible (e.g., in terms of performance, such as by using any of a variety of heuristics).

While described herein as "intercepting" calls made by an application, in some embodiments, new and/or modified version of existing methods may be provided that are called instead of existing, legacy methods. For instance, in a Java-based embodiment, new classes may be added to a JDK library that may be instantiated whenever particular methods are called and/or whenever particular objects are generated (e.g., Streams objects/methods). For example, an OffloadInfo may be introduced in the Streams library to be instantiated every time an IntStream is created in the Head( )method of IntPipeline.java, according to one Java-based example embodiment.

Continuing, the above OffloadInfo example, an Offload-info class may include methods corresponding to IntStream (or other) methods (e.g., that are offload candidates) that are called by the IntStream methods (e.g., within IntPipeline.java). The methods of Offloadinfo may record information regarding different stages of the IntStream pipeline. The information may be recorded in the order encountered for a current Streams invocation, according to some embodiments. If a pipeline stage (e.g., an IntStream method) has arguments (e.g., an IntPredicate), a reference to the argument may be recorded in OffloadInfo.

In some embodiments, Offloadinfo may also record additional information, such as information regarding the source data (e.g., the datastream) to which the data operations should be applied. Additionally, OffloadInfo may include a method, such as an Evaluate( )method, that may be invoked at the start of a terminal operation of the IntStream (i.e., in a Java Streams example) in order to perform (or attempt) the offload of the pipeline (e.g., one or more data operations to be applied to a datastream) to the analytics accelerating co-processor.

In some embodiments, an Evaluate( )method may apply one or more checks on the characteristics of the pipeline and the source data to determine whether the pipeline may be offloaded. As noted above, as described herein, these checks may be considered part of an attempt to offload data operations (e.g., perform one or more data operations on a datastream using an analytics accelerating co-processor). Thus, an offload engine, such as offload engine 120, may be configured to apply one or more checks to determine whether to proceed with preforming data operations using the co-processor or to fallback and perform the data operations using the general purpose CPU core(s) (i.e., in the case that the offload is not feasible). When falling back, offload engine 120, may perform the data operations on the datastream using the general purpose CPU core(s) by returning execution to the legacy datastream processing library. For example, in a Java Streams based example, offload engine 120 may return execution to the existing Streams library implementation (i.e., that will perform the data operations on the datastream in software using the general purpose CPU core), in response to determining that the attempt to offload was not profitable based on heuristics check, according to one embodiment.

Figure 5:
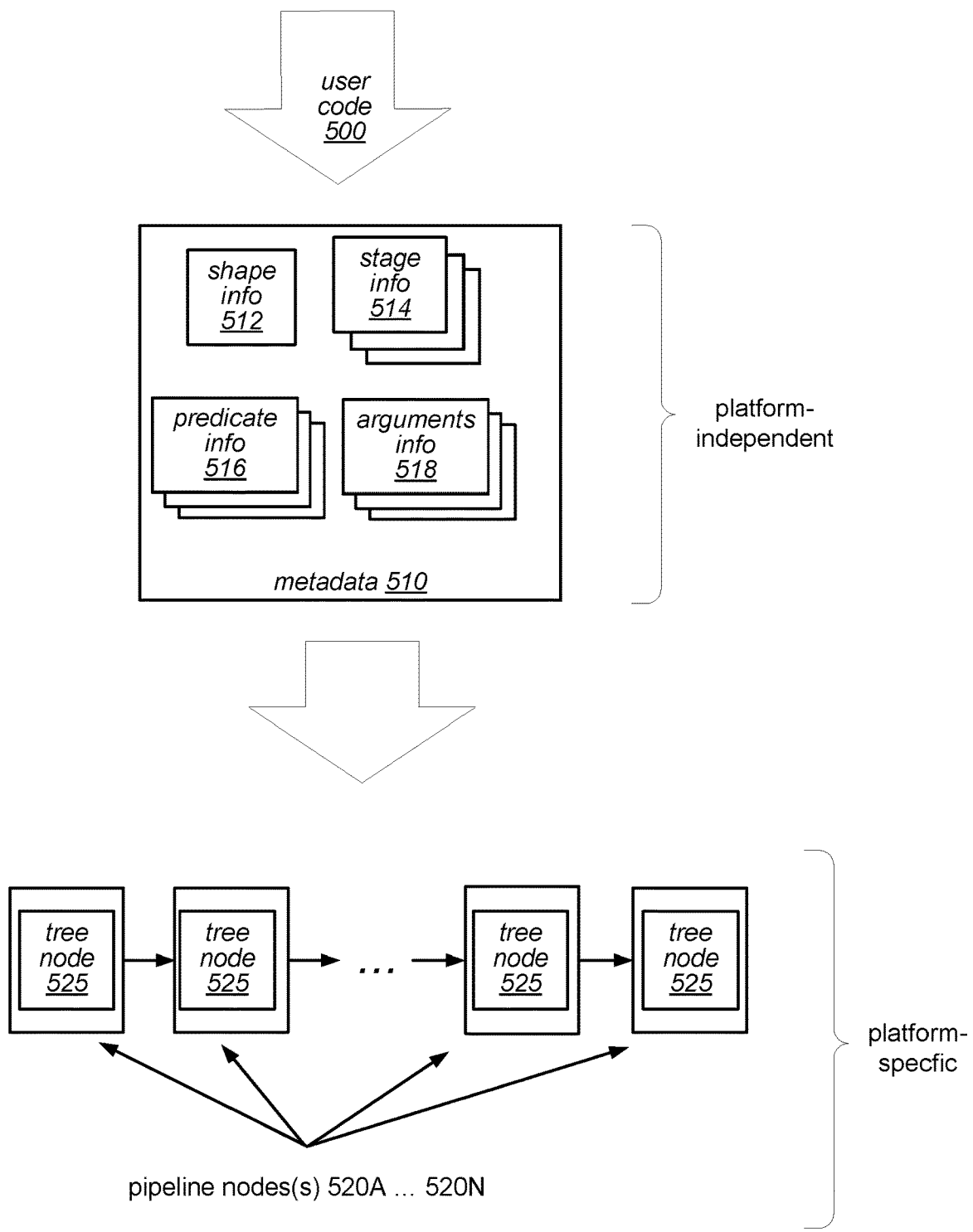
FIG. 5 is a logical block diagram illustrating an example dataflow through a system utilizing an offload engine, as described herein according to one embodiment.

If offload is found to be feasible, offload engine 120 may generate metadata regarding the data operations and the datastream, such as pipeline shape, stages, predicates, arguments for each stage, etc. FIG. 5 is a logical diagram illustrating, according to one example embodiment, a dataflow through a system configured to implement Resource Efficient Acceleration of Datastream Analytics Processing Using an Analytics Accelerator, as described herein. As shown in FIG. 5, offload engine 120 may be configured to generate, from information derived from the user code (e.g., the operations to be performed on the datastream), metadata 510. Metadata 510 may include various types of information regarding the data operations and/or the datastream, according to different embodiments. For instance, metadata 510 may include, but may not be limited to shape info 512, which may describe and/or characterize the geometry of the pipeline (e.g., how the stages are connected to each other), stage info 514, which may describe and/or characterize one or more stages in the pipeline, predicate info 516, which may describe and/or characterize one or more predicates that are part of the pipeline, and arguments info 518, which may describe and/or characterize one or more arguments used by different stages in the pipeline. The exact information included in metadata 510, as well as the format of the information included in metadata 510, may vary from embodiment to embodiment, and may vary from that illustrated in FIG. 5.

In some embodiments, the metadata may be cached, so as to allow its reuse and prevent having to collect the information repeatedly. For example, in one example embodiment offload engine may construct and cache a byte array containing platform agnostic metadata encoding the pipeline shape, stages, predicates and needed arguments for each stage. Additionally, when variables are used in the predicate, their information may also be embedded as part of the metadata generated by offload engine 120, according to some embodiments.

In some embodiments, offload engine 120 may be configured to determine information regarding predicates utilizing any of various forms of code analysis. For example, ASM, a Java bytecode manipulation and analysis framework, may be utilized by offload engine 120 in a Java Streams based embodiment. Thus, when generating metadata regarding the data operations and the datastream, offload engine 120 may be configured to pass predicates corresponding to individual pipeline stages to a code analyzer (e.g., an ASM adapter in a Java-based embodiment). The code analyzer may then examine the implementation/body of the method (e.g., the IntPredicates' 'test(I)Z' method) and construct the metadata for offload engine 120. If a particular predicate is not offload-friendly, the adapter may return an error code, possibly hinting that offload engine 120 should fallback (e.g., perform the data operations on the datastream using a general purpose CPU core).

The results of analyzing code to generate the metadata may be returned in any of variety of formats. For example, in one Java-based embodiment, successfully parsed IntPredicates may result in a Reverse Polish Notation (RPN) based expression tree captured in a byte array (e.g., as metadata) that may be returned by the ASM adapter. As noted above, when variables are used in the predicate, their information may also be embedded as part of the metadata. Additionally, in some embodiments, information about the variables like class name, field name and type may be stored separately in a data structure by the code analyzer (e.g., the ASM adapter in one Java-based example) and passed back along with the metadata. The values for these variables may be captured using an Evaluate( )method of the offload engine and the metadata may be reconstructed, ready to be passed to a platform specific intrinsic method that interacts with the co-processor.

In some embodiments, a system configured to implement Resource Efficient Acceleration of Datastream Analytics Processing Using an Analytics Accelerator, as described herein, may include a method representing a single entry point for various methods and/or functions that implement the offloading to a platform-specific accelerator. In other words, offload engine 120 may be configured to use a single method as an entry point for performing the data operations on the datastream using an analytics accelerating co-processor.

Thus, in some embodiments, an Evaluate( )method, as described above, may invoke a method OffloadEvaluate( )(which may be a static method) with the metadata and source data as arguments. An OffloadEvaluate( )method may, in some embodiments, return information indicating the result of the attempt to perform the data operations on the datastream using the analytics accelerating co-processor. For instance, in one Java-based example embodiment, a Java object, OffloadResult, may encode success/error codes, as well as a final result of the pipeline evaluation. If the OffloadEvaluate( )method indicates a failure to offload successfully, the Evaluate( )method may return false to offload engine 120 and offload engine 120, in response, may perform the data operations on the datastream using the general purpose CPU core(s), as described above. In one embodiment, in response to the OffloadEvaluate( )method indicating a failure to offload successfully, the Evaluate( )method may return false (e.g., or other indication of unsuccessful offloading) to the terminal operation of the pipeline. If the offload was successful, offload engine 120 (and/or the terminal operation) may return using the results from performing the data operations on the datastream using the analytics accelerating co-processor (e.g., the accelerator) as the final result, according to some embodiments.

Additionally, in some embodiments, the default implementation of an OffloadEvaluate( )method (e.g., where no compiler intrinsic is triggered) may return an OffloadResult object indicating a failure to successfully offload. Thus, if acceleration is disabled and/or not supported on a particular platform, control may be returned to an existing implementation (e.g., of the data operations) without any side-effects, according to one embodiment.

Platform-Specific Intrinsic Functions:

The intrinsic (e.g., platform specific) implementation of OffloadEvaluate( ) may, in some embodiments, construct a new object (e.g., a new OffloadResult object) using a return value from the offload. Using a Java Streams based example, a method handle_offload( ) may construct a new Java object of type OffloadResult using the return value from streamOffload, as shown in the following example source code:

OffloadResult_C streamOffload(jbyte*metaData, jint mdSize, void*src, jint srcSize);

In the above example source code, OffloadResult_C may be considered the C counterpart of the Java class OffloadResult with one to one mapping of members. The prototype of streamOffload( ) may be identical for multiple (possibly all) platforms, however, the implementation may be defined per platform and may be specific to platform-specific acceleration methods. For instance, according to one Java-based example, the implementation may be controlled by architecture flags that include streamOffload_ARCH.hpp. If a particular architecture does not implement a streamOffload (or similar) method, the default behavior may be to return an indication of an unsuccessful offload (e.g., an indication that no acceleration took place) and the default streams implementation may be invoked. In other words, if a particular architecture does not provide an entry method for performing an offload, offload engine 120 may be configured to treat the attempt to offload as unsuccessful and, in response, perform the data operations on the datastream using the one or more general purpose CPU cores, such as by returning control to the legacy implementation of the datastream processing code.

Translation to Co-Processor Calls:

In the platform-specific (e.g., intrinsic) method configured to perform the offload (e.g., streamOffload in a Java-based example), the pipeline and predicate metadata may be parsed and a linked list of PipelineNodes may be created. Returning to FIG. 5, pipeline metadata 510 may be analyzed, examined, and/or parsed and the results used to generate the linked list of pipeline nodes(s) 520A . . . 520N, according to some embodiments. Each PipelineNode 520 may represents one pipeline stage (e.g., a data operation to be applied to the datastream). Inside each PipelineNode 520, there may be a TreeNode 525 representing the structure of the predicate (if any) as a binary tree for that pipeline stage. Such a binary tree may be constructed from the predicate metadata provided (e.g., in Reverse Polish Notation) with operations as nodes of the tree, according to one embodiment. In other embodiments, information and/or metadata regarding the data operations to be performed on the datastream may be generated, stored and/or provided in different ways and using different data structures and/or methods. The manner of construction and/or use of the metadata described herein represents merely one example according to one particular example embodiment.

Before processing the pipeline, the source data may be broken down into multiple chunks (e.g., according to a heuristic based chunk size). The Pipeline may then be executed from the beginning to end for each of the input chunks, according to some embodiments. For operations that support early failover (e.g., an early match is found for an anyMatch( ) terminal stage), the implementation on the co-processor may return early with the result and therefore may not process the rest of the input data chunks.

Additionally, in some embodiments, a quick translation pass may be performed on the pipeline and the predicate trees, such as to combine some of the tree nodes into complex (e.g., combined) operations that may be directly supported by the particular architecture and/or co-processor. After the translation pass (if any) is performed, the nodes in the predicate tree may be translated to platform-specific co-processor calls.

For example, in one embodiment, the linked list of pipeline operations, may be iterated over (e.g., starting at the head node), executing each of the pipeline stages in order. If there is a predicate tree for a stage, that predicate tree may be processed recursively, thereby generating calls to the co-processor functions for the tree nodes, according to some embodiments. If the current pipeline stage is not the terminal operation, the output array of the current pipeline stage may be the source array of the next pipeline stage (e.g., if chaining is used).

Alternatively, if the current stage is the terminal operation, a final result may be returned. Thus, after performing the one or more data operations on the datastream using the analytics accelerating co-processor, offload engine 120 may return the results to the application. For instance, in one example embodiment, the results of executing the pipeline may be returned by constructing offloadResult_C data structure, although results may be returned in different manner and/or using different data structures, according to different embodiments. If there is a failure to offload (e.g., the attempt to offload is unsuccessful), a reason that the failure occurred may be encoded as error codes and may be included in the returned results.

In some embodiments, data analytics accelerators, such as the DAX co-processor on SPARC™ systems, may only support unsigned compare operations. Thus, to translate a call from a signed Stream to that of co-processor, additional processing may have to be performed. For instance, in one embodiment, the input vector and the constants used in the predicate may be XOR'd with the appropriate boundary elements. As one example, to translate an IntStream, the input vector and constant with 2^31 may be XOR'd, as shown below:

Predicate:
−40<12<20−>(231−40)<(231+12)<10 (2**31+20)

In some embodiments, a signed scan value may be broken into an unsigned scan range for performance reasons instead of use XOR. A signed scan range may be accomplished by breaking it into two signed scan value predicates as shown for one DAX based example below:

x>5, dax_allMatch(GREATER_THAN, 5, SMALLER_THAN, 2**31)

The intrinsic gateway (e.g., the platform-specific entry method) may be implemented such that it can perform offload, but may also help with the initialization of the OffloadInfo (e.g., when a Stream is initialized) depending on the parameters passed to the entry method. Thus, in some embodiments, the intrinsic entry method may provide additional information to enable efficient initialization. For instance, according to one example embodiment, the intrinsic entry method may check various type of information, such as a JVM flag StreamAcceleration, and/or the capability of the particular accelerator on the system in order to provides the necessary information to enable efficient initialization.

Garbage Collection Support:

Since the data structures on the heap may be implemented in order to support direct access by the co-processor, in some embodiments, steps may be taken to ensure that a garbage collection does not happen until the source data is consumed completely by the offload code (e.g., until all the data operations have been performed on the datastream). In some embodiments, a co-processor may be configured (e.g., equipped) to support asynchronous submit of jobs as well as polling mechanisms to query if the job is completed. Thus, an offload thread may continue execution on the core while the co-processor processes the offload. In other words, in some embodiments, the application may be able to continue executing other code while waiting for the analytics accelerating co-processor to perform the data operations on the datastream (e.g., while waiting for the offload engine to perform the data operations on the datastream using the co-processor).

Additionally, in some embodiments, garbage collection state information may be checked and/or monitored during an offload. For example, in one embodiment, a Safepoint-Synchronize::_state may be periodically checked to determine if a Safepoint is needed. If a safepoint is required, the co-processor operation (e.g., the attempt at offload) may stop and the offload may return indicating an unsuccessful offload (e.g., a failure). In response, offload engine 120 may fallback/de-optimize and perform the data operations on the datastream using the general purpose CPU cores, such as by returning control to the existing/legacy datastream processing execution on the core, thereby allowing a safepoint to be generated and a garbage collection operation to be performed. For example, in one Java Streams based embodiment, offload engine 120 may, in response to an unsuccessful attempt to offload due to a garbage collection safepoint being required, return control to the existing Java Streams implementation, thereby allowing the data operations to be performed on the datastream using the general purpose CPU core(s). This feature may, in some embodiments, ensure that garbage collection pause times are met and that mutator thread are not stalled (e.g., waiting for the offload thread) in need of a garbage collection operation. For example, in one example embodiment, the streamOffload( ) may include mechanisms to ensure that garbage collection pause time guarantees are met and that remaining mutator threads are not stalled on the offload thread in need of a garbage collection operation.

As noted above, in some embodiments, an attempt to perform data operations on a stream of data using a co-processor may be unsuccessful if the attempt takes longer than a predetermined timeout period. If the attempt to perform the data operations times out, offload engine 120 may be configured to perform the data operations on the stream of data using the general purpose CPU core(s), as described previously. Therefore, in some embodiments, co-processor operations may be given a heuristic based TIMEOUT period to ensure that co-processor calls return within a reasonable amount of time. Thus, if a busy co-processor or a hardware problem results in an execution time longer than the predetermined TIMEOUT period, the co-processor operation may be aborted and execution may de-optimize to the core (e.g., the data operations may be performed on the datastream using a general purpose CPU core rather than the analytics accelerating co-processor).

Example Computing System

Figure 6:
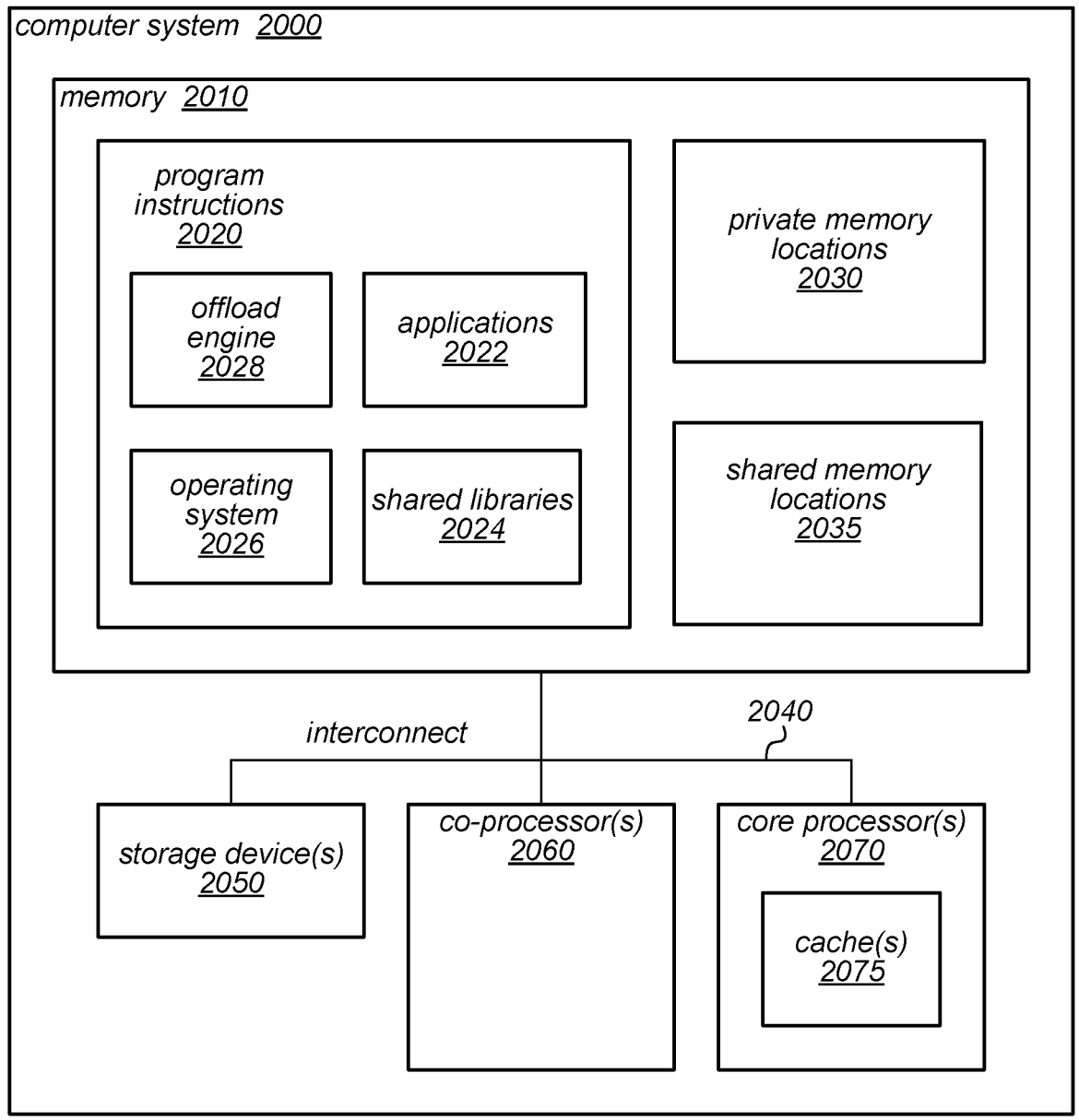
FIG. 6 is a block diagram illustrating one embodiment of a computing system that is configured to implement the mechanisms described herein.

The techniques, mechanisms and methods described herein for Resource Efficient Acceleration of Datastream Analytics Processing Using an Analytics Accelerator may be implemented on or by any of a variety of computing systems, in different embodiments. For example, FIG. 6 is a block diagram illustrating one embodiment of a computing system that is configured to implement such techniques, mechanisms and methods, as described herein, according to various embodiments. The computer system 2000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device. In some embodiments, computer system 2000 may represent a system configured to allow offloading of datastream processing to an analytics accelerating co-processor.

Some of the mechanisms for Resource Efficient Acceleration of Datastream Analytics Processing Using an Analytics Accelerator, as described herein, may be provided as a computer program product, or software, that may include a non-transitory, computer-readable storage medium having stored thereon instructions, which may be used to program a computer system 2000 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 2000 may include one or more processors 2070, such as general purpose CPU core(s) 140; which may include multiple cores, any of which may be single- or multi-threaded. For example, multiple processor cores may be included in a single processor chip (e.g., a single core processor 2070), and multiple processor chips may be included in computer system 2000. Each of the core processors 2070 may include a cache or a hierarchy of caches 2075, in various embodiments. For example, each processor chip 2070 may include multiple L1 caches (e.g., one per processor core) and one or more other caches (which may be shared by the processor cores on a single processor). The computer system 2000 may also include one or more co-processors 2060, such as an analytics accelerating co-processor 150. The computer system 2000 may also include one or more storage devices 2050 (e.g. optical storage, magnetic storage, hard drive, tape drive, solid state memory, etc.) and one or more system memories 2010 (e.g., one or more of cache, SRAM, DRAM, RDRAM, EDO RAM, DDR RAM, SDRAM, Rambus RAM, EEPROM, etc.). In some embodiments, one or more of the storage device(s) 2050 may be implemented as a module on a memory bus (e.g., on interconnect 2040) that is similar in form and/or function to a single in-line memory module (SIMM) or to a dual in-line memory module (DIMM). Various embodiments may include fewer or additional components not illustrated in FIG. 20 (e.g., video cards, audio cards, additional network interfaces, peripheral devices, a network interface such as an ATM interface, an Ethernet interface, InfiniBand™ (IB) interface, a Frame Relay interface, etc.)

The one or more processors 2070, the one or more co-processors 2060, the storage device(s) 2050, and the system memory 2010 may be coupled to the system interconnect 2040. One or more of the system memories 2010 may contain program instructions 2020. Program instructions 2020 may be executable to implement offload engine 2028, offload engine 120, one or more applications 130, one or more applications 2022, shared libraries 2024, or operating systems 2026. In some embodiments, offload engine 2028 may be same as, or may represent offload engine 120. Similarly, in some embodiments, applications 2022 may be same as, or may represent applications 130. In some embodiments, program instructions 2020 may be executable to implement a contention manager (not shown). In some embodiments, program instructions 2020 (or more specifically, shared libraries 2024) may include methods for Resource Efficient Acceleration of Datastream Analytics Processing Using an Analytics Accelerator, or any other methods that may be invoked by offload engine 120, offload engine 2018, applications 130 and/or applications 2022.

Program instructions 2020 may be encoded in platform native binary, any interpreted language such as Java™ byte-code, or in any other language such as C/C++, the Java™ programming language, etc., or in any combination thereof. In various embodiments, offload engine 2028, offload engine 120, applications 2022, applications 130, operating system 2026, and/or shared libraries 2024 may each be implemented in any of various programming languages or methods. For example, in one embodiment, offload engine 2028 and operating system 2026 may be based on the Java programming language, while in another embodiment they may be written using the C or C++ programming languages. Similarly, applications 2022 may be written using the Java programming language, C, C++, or another programming language, according to various embodiments. Moreover, in some embodiments, offload engine 2028, applications 2022, operating system 2026, and/shared libraries 2024 may not be implemented using the same programming language. For example, applications 2022 may be C++ based, while offload engine 2028 may be developed using C.

Although the embodiments above have been described in considerable detail, numerous variations and modifications will become apparent to those skilled in the art once the above disclosure is fully appreciated. For example, although many of the embodiments are described in terms of particular types of operations that support acceleration of datastream analytics processing, it should be noted that the techniques, methods and mechanisms disclosed herein may be applicable in other contexts in which applications access and/or operate on different types of data and/or datastreams than those described in the examples herein and in which different embodiments of the underlying hardware that supports analytics acceleration described herein are supported or implemented. It is intended that the following claims be interpreted to embrace all such variations and modifications.

What is claimed:

1. A system, comprising:
   one or more general purpose central processing unit (CPU) cores;
   an analytics accelerating co-processor; and
   a memory comprising program instructions that, when executed by the one or more general purpose CPU cores cause the one or more general purpose CPU cores to implement a platform-independent, object-oriented, runtime environment;
   wherein the runtime environment comprises an offload engine configured to:
      intercept one or more method calls invoked by an application executing within the runtime environment, wherein the one or more method calls are configured to perform one or more data operations on a stream of data using the one or more general purpose CPU cores;
      in response to intercepting the one or more method calls, execute the one or more data operations on the stream of data;

wherein to execute the one or more data operations on the stream of data, the offload engine is configured to:
   attempt to perform the one or more data operations on the stream of data using the analytics accelerating co-processor; and
   determine whether the attempt to perform the one or more data operations on the stream of data using the analytics accelerating co-processor was unsuccessful based at least in part on determining whether a garbage collection operation is required.

2. The system of claim 1, wherein the offload engine is further configured to return results of performing the one or more data operations on the stream of data to the application in response to a determination that the one or more data operations were successfully performed on the stream of data using the analytics accelerating co-processor.

3. The system of claim 1, wherein to attempt to perform the one or more data operations on the stream of data using the analytics accelerating co-processor, the offload engine is further configured to determine whether the one or more data operations, when applied to the stream of data, are suitable for parallel operation.

4. The system of claim 1, wherein, in response to a determination that the attempt to perform the one or more data operations on the stream of data using the analytics accelerating co-processor was unsuccessful, the offload engine is further configured to:
   perform the one or more data operations on the stream of data using the one or more general purpose CPU cores; and
   return results of performing the one or more data operations on stream of data to the application.

5. The system of claim 4, wherein the determination that the attempt to perform the one or more data operations on the stream of data using the analytics accelerating co-processor was unsuccessful is based, at least in part, on a determination that the attempt will take longer than a predetermine timeout period.

6. The system of claim 4, wherein the determination that the attempt to perform the one or more data operations on the stream of data using the analytics accelerating co-processor was unsuccessful is based, at least in part, on a determination that the garbage collection operation is required.

7. The system of claim 6, wherein the garbage collection operation comprises a safepoint generation.

8. The system of claim 4, wherein the determination that the attempt to perform the one or more data operations on the stream of data using the analytics accelerating co-processor was unsuccessful is based, at least in part, on a determination that the one or more data operations, when applied to the stream of data, are not suitable for parallel operation.

9. The system of claim 1, wherein the attempt to perform the one or more data operations on the stream of data using the analytics accelerating co-processor is based, at least in part on a size of data in the stream of data to which the one or more data operations are to be applied.

10. A method, comprising:
   performing by one or more computers:
      executing, by an offload engine executing of a platform-independent, object-oriented, runtime environment, one or more data operations on a stream of data in response to intercepting one or more method calls invoked by an application executing within the runtime environment, wherein the one or more intercepted method calls are configured to perform the one or more data operations on the stream of data using one or more general purpose CPU cores of the one or more computers;
      wherein said executing comprises:
         attempting, by the offload engine, to perform the one or more data operations on the stream of data using an analytics accelerating co-processor; and
         determining whether the attempt to perform the one or more data operations on the stream of data using the analytics accelerating co-processor was unsuccessful based at least in part on determining whether a garbage collection operation is required.

11. The method of claim 10, further comprising returning, by the offload engine, results of performing the one or more data operations on the stream of data to the application in response to a determination that the one or more data operations were successfully performed on the stream of data using the analytics accelerating co-processor.

12. The method of claim 10, wherein said attempting comprises determining whether the one or more data operations, when applied to the stream of data, are suitable for parallel operation.

13. The method of claim 10, the method further comprising:
   in response to a determination that the attempt to perform the one or more data operations on the stream of data using the analytics accelerating co-processor was unsuccessful:
      performing, by the offload engine, the one or more data operations on the stream of data using the one or more general purpose CPU cores; and
      returning, by the offload engine, results of performing the one or more data operations on stream of data to the application.

14. The method of claim 13, wherein said determining that the attempt to perform the one or more data operations on the stream of data using the analytics accelerating co-processor was unsuccessful is based, at least in part, on determining that the attempt will take longer than a predetermine timeout period.

15. The method of claim 13, wherein said determining that the attempt to perform the one or more data operations on the stream of data using the analytics accelerating co-processor was unsuccessful is based, at least in part, on determining that the garbage collection operation is required.

16. The method of claim 13, wherein said determining that the attempt to perform the one or more data operations on the stream of data using the analytics accelerating co-processor was unsuccessful is based, at least in part, on determining that the one or more data operations, when applied to the stream of data, are not suitable for parallel operation.

17. The method of claim 10, wherein said attempting to perform the one or more data operations on the stream of data using the analytics accelerating co-processor is based, at least in part on a size of data in the stream of data to which the one or more data operations are to be applied.

18. A non-transitory, computer-readable storage medium storing program instructions that when executed on one or more computers cause the one or more computers to perform:
   executing, by an offload engine executing of a platform-independent, object-oriented, runtime environment, one or more data operations on a stream of data in response to intercepting one or more method calls invoked by an application executing within the runtime environment, wherein the one or more intercepted method calls are configured to perform the one or more data operations on the stream of data using one or more general purpose CPU cores of the one or more computers;

wherein said executing comprises:
   attempting, by the offload engine, to perform the one or more data operations on the stream of data using an analytics accelerating co-processor; and
   determining whether the attempt to perform the one or more data operations on the stream of data using the analytics accelerating co-processor was unsuccessful based at least in part on determining whether a garbage collection operation is required.

19. The storage medium of claim 18, wherein the program instructions further cause the one or more computers to perform:
   returning, by the offload engine, results of performing the one or more data operations on the stream of data to the application in response to a determination that the one or more data operations were successfully performed on the stream of data using the analytics accelerating co-processor.

20. The storage medium of claim 18, wherein the program instructions further cause the one or more computers to perform:
   in response to a determination that the attempt to perform the one or more data operations on the stream of data using the analytics accelerating co-processor was unsuccessful:
      performing, by the offload engine, the one or more data operations on the stream of data using the one or more general purpose CPU cores; and
      returning, by the offload engine, results of performing the one or more data operations on stream of data to the application.

* * * * *

UNITED STATES PATENT AND TRADEMARK OFFICE
CERTIFICATE OF CORRECTION

Page 1 of 2

PATENT NO. : 10,853,125 B2
APPLICATION NO. : 15/287695
DATED : December 1, 2020
INVENTOR(S) : Ganesan et al.

It is certified that error appears in the above-identified patent and that said Letters Patent is hereby corrected as shown below:

On the Title Page

On page 2, Column 2, item (56) under Other Publications, Line 11, delete "Languuage" and insert -- Language --, therefor.

In the Specification

In Column 5, Line 43, after "library" insert -- . --.

In Column 6, Line 52, delete "implemetation," and insert -- implementation, --, therefor.

In Column 11, Lines 34-35, delete "Head()method" and insert -- Head() method --, therefor.

In Column 11, Line 52, delete "Evaluate( )method," and insert -- Evaluate( ) method, --, therefor.

In Column 11, Line 58, delete "Evaluate( )method" and insert -- Evaluate( ) method --, therefor.

In Column 13, Line 14, delete "Evaluate( )method" and insert -- Evaluate( ) method --, therefor.

In Column 13, Line 28, delete "Evaluate( )method," and insert -- Evaluate( ) method, --, therefor.

In Column 13, Lines 29-30, delete "OffloadEvaluate( )(which" and insert -- OffloadEvaluate( ) (which --, therefor.

In Column 13, Line 31, delete "OffloadEvaluate( )method" and insert -- OffloadEvaluate( ) method --, therefor.

In Column 13, Line 38, delete "OffloadEvaluate( )method" and insert -- OffloadEvaluate( ) method --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,853,125 B2

In Column 13, Line 39, delete "Evaluate( )method" and insert -- Evaluate( ) method --, therefor.

In Column 13, Line 43, delete "OffloadEvaluate( )method" and insert -- OffloadEvaluate( ) method --, therefor.

In Column 13, Line 44, delete "Evaluate( )method" and insert -- Evaluate( ) method --, therefor.

In Column 13, Line 53, delete "OffloadEvaluate( )method" and insert -- OffloadEvaluate( ) method --, therefor.

In Column 18, Line 27, delete "and/shared" and insert -- and/or shared --, therefor.